US011640043B2

(12) United States Patent
Lentz (10) Patent No.: US 11,640,043 B2
(45) Date of Patent: May 2, 2023

(54) OPTICAL FOCUS CONTROL BASED ON RISLEY-LIKE ELEMENTS

(71) Applicant: US Gov't as represented by Secy of Air Force, Wright-Patterson AFB, OH (US)

(72) Inventor: Joshua Lentz, Niceville, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 17/567,452

(22) Filed: Jan. 3, 2022

(65) Prior Publication Data

US 2022/0244490 A1 Aug. 4, 2022

Related U.S. Application Data

(60) Provisional application No. 63/134,613, filed on Jan. 7, 2021.

(51) Int. Cl.
*G02B 7/28* (2021.01)
*G02F 1/1335* (2006.01)
*G02F 1/139* (2006.01)
*G02B 5/04* (2006.01)

(52) U.S. Cl.
CPC .............. *G02B 7/28* (2013.01); *G02B 5/04* (2013.01); *G02F 1/139* (2013.01); *G02F 1/133528* (2013.01); *G02F 1/133607* (2021.01)

(58) Field of Classification Search
CPC .................................. G02F 1/133607
See application file for complete search history.

(56) References Cited

U.S. PATENT DOCUMENTS

| 8,610,853 | B2 | 12/2013 | Escuti |
| 9,195,092 | B2 | 11/2015 | Escuti et al. |
| 9,684,094 | B2 | 6/2017 | Jiang |
| 9,689,087 | B1 | 6/2017 | Li et al. |
| 9,726,783 | B2 | 8/2017 | Perrier-Cornet |
| 9,733,467 | B2 | 8/2017 | Kim et al. |
| 10,331,009 | B2 | 6/2019 | Dmitriev |

(Continued)

OTHER PUBLICATIONS

Chulwoo Oh, Chulwoo Oh, Jihwan Kim, Jihwan Kim, John F. Muth, John F. Muth, Michael J. Escuti, Michael J. Escuti,} "A new beam steering concept: Risley gratings", Proc. SPIE 7466, Advanced Wavefront Control: Methods, Devices, and Applications VII, 74660J (Aug. 11, 2009); doi: 10.1117/12.828005; https://doi.org/10.1117/12.828005.

(Continued)

*Primary Examiner* — Edmond C Lau
(74) *Attorney, Agent, or Firm* — AFMCLO/JAZ; Timothy M. Barlow (57) ABSTRACT

An optical focus control and method use rotations of a set of shift-invariant optical elements (Risley elements) that are fairly tolerant to optical misalignments and wobble in control systems. The Risley elements can be Risley prisms, Risley gratings, or photonic crystals that impart a fixed angular offset. Aligning at least one pair of Risley elements that are individually rotated can achieve an angular correct to light received off-axis for better detection by an optical detector, improving focus control.

8 Claims, 6 Drawing Sheets

(56) References Cited

U.S. PATENT DOCUMENTS

2004/0057656 A1* 3/2004 Chu .................... G02B 6/3524
385/36
2019/0243128 A1* 8/2019 Johnson ............... G02B 26/108

OTHER PUBLICATIONS

Rumpf, R. C., Pazos, J. J., Digaum, J. L., & Kuebler, S. M. (2015). Spatially variant periodic structures in electromagnetics. Philosophical Transactions of the Royal Society A: Mathematical.

Jennefir L. Digaum, Rashi Sharma, Daniel Batista, Javier J. Pazos, Raymond C. Rumpf, Stephen M. Kuebler, "Beam-bending in spatially variant photonic crystals at telecommunications wavelengths", Proc. SPIE 9759, Advanced Fabrication Technologies for Micro/Nano Optics and Photonics IX, 975911 (Mar. 14, 2016).

Pazos, j. (2010). Digitally manufactured spatially variant photonic crystals. Phd. University of texas at el paso.

Liu, Longju & Hurayth, Abu & Li, Jingjing & Hillier, Andrew & Lu, Meng. (2016). A strain-tunable nanoimprint lithography for linear variable photonic crystal filters. Nanotechnology. 27. 295301.

Liu, Xiaojun & Da, Yun & Xuan, Yimin. (2017). Full-spectrum light management by pseudo-disordered moth-eye structures for thin film solar cells. Optics Express. 25. A824.

Beaulieu, Michael & Hendricks, Nicholas & Watkins, James. (2014). Large-Area Printing of Optical Gratings and 3D Photonic Crystals Using Solution-Processable Nanoparticle/Polymer Composites. ACS Photonics.

Sun, Tangyou & Xu, Zhimou & Xu, Haifeng & Zhao, Wenning & Wu, Xinghui & Liu, Sisi & Ma, Zhichao & He, Jian & Liu, Shiyuan & Peng, Jing. (2013). Photonic crystal structures on nonflat surfaces fabricated by dry lift-off soft UV nanoimprint lithography. Journal of Micromechanics and Microengineering. 23.

Calafiore, Giuseppe & Fillot, Quentin & Dhuey, Scott & Sassolini, Simone & Salvadori, Filippo & Prada, Camilo & Munechika, Keiko & Peroz, Christophe & Cabrini, Stefano & Piña-Hernandez, Carlos. (2016). Printable photonic crystals with high refractive index for applications in visible light. Nanotechnology. 27.

* cited by examiner

OPTICAL FOCUS CONTROL BASED ON RISLEY-LIKE ELEMENTS

CROSS-REFERENCE TO RELATED APPLICATIONS

This application claims the benefit of priority under 35 U.S.C. § 119(e) to U.S. Provisional Application Ser. No. 63/134,613 entitled "Optical focus control based on Risley-like elements", filed 7 Jan. 2021, the contents of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to optical focusing system, and more particular to optical focusing systems that can correct for off-axis sources.

2. Description of the Related Art

Figure 1:
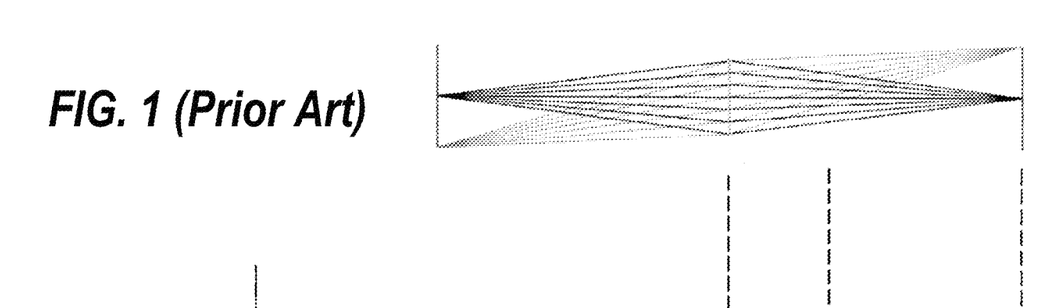
FIG. 1 is a diagram of a conventional focusing system having lens or lens group at a first position to focus an off-angle source at a first angle to a substantially normal angle.

FIG. 1 is a diagram of a conventional focusing system having lens or lens group at a first position to focus an off-angle source at a first angle to a substantially normal angle.

Figure 2:
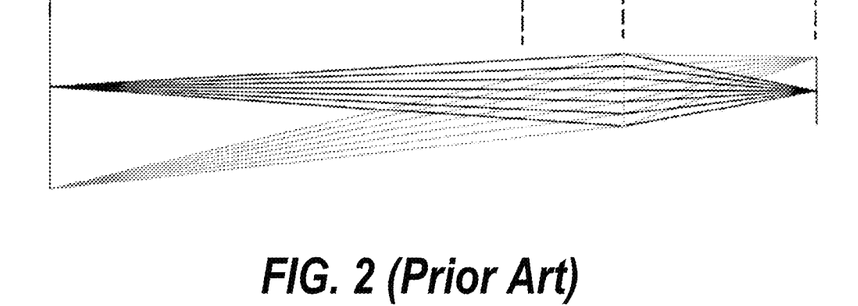
FIG. 2 is a diagram of the conventional focusing system of FIG. 1 having the lens or lens group longitudinally moved physically to a second position to focus another off-angle source at a second angle that is greater than the first angle to a substantially normal angle.

FIG. 2 is a diagram of the conventional focusing system of FIG. 1 having the lens or lens group longitudinally moved physically to a second position to focus another off-angle source at a second angle that is greater than the first angle to a substantially normal angle.

Traditional focusing systems rely on axial translation of a lens or lenses in the optical system to shift the image of an object onto a fixed detector plane. This process inherently places tight tolerances on the mechanical system that moves the lens (or lenses) so that the lens does not experience significant decentration or tilts, in order to prevent the introduction of optical wavefront errors and hence preserve the image quality of the system.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The present disclosure provides optical focus control through rotations of multiple Risley prisms or other optical elements (polarization gratings or photonic crystals) that function in the same manner as Risley prisms and shall be referred to in this document as "Risley elements". Aspects of the present innovation can be realized in a manually operated system. In one or more embodiments, an electrically controlled device or devices is implemented to automate aspects of the present innovation.

Figure 3:
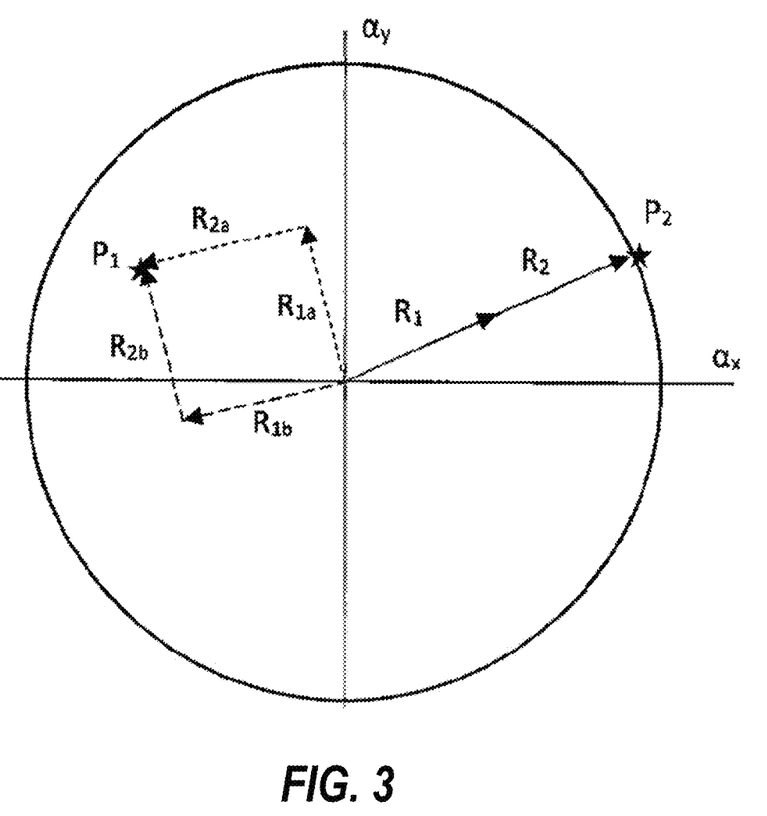
FIG. 3 is a diagram of pointing solutions in angular space for a Risley Prism pair, according to one or more embodiments.

FIG. 3 is a diagram of pointing solutions in angular space for a Risley Prism pair, according to one or more embodiments. The present disclosure provides a method of focus control using a set of shift-invariant optical elements that are fairly tolerant to optical misalignments and wobble in control systems. This lowers the system precision requirements in the lens engineering as well as the focusing system itself.

Figure 4A:
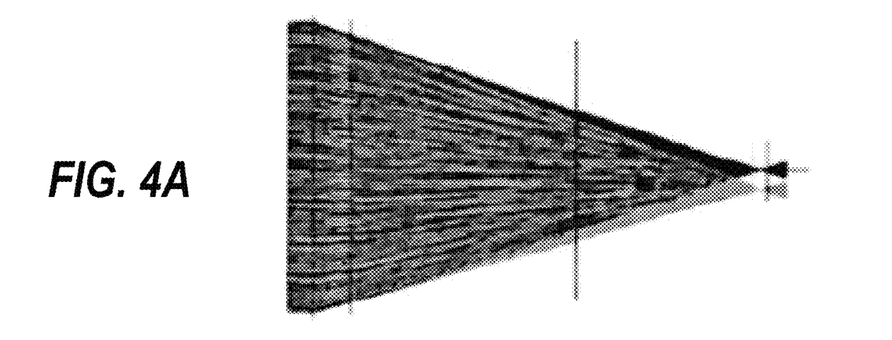
FIG. 4A is a diagram of a focusing system having a focusing mechanism of first and second Risley elements with an imaging object at a first object location, according to one or more embodiments.
Figure 4B:
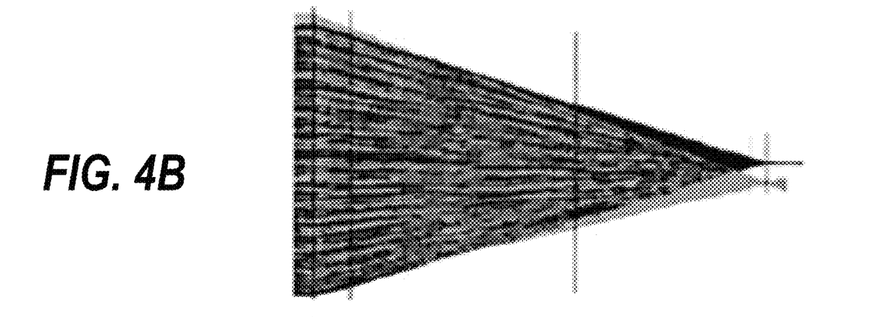
FIG. 4B is a diagram of the focusing system of FIG. 4A with the imaging location at a second object location that a decreased distance to the first object location, according to one or more embodiments.
Figure 4C:
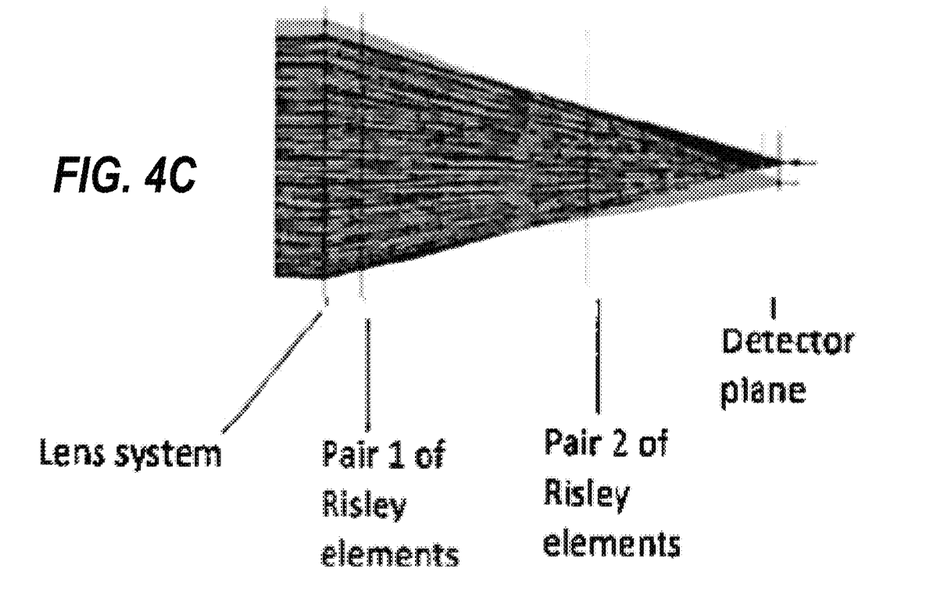
FIG. 4C is a diagram of the focusing system of FIG. 4B with the imaging location at a third object location that a decreased distance to the second object location, according to one or more embodiments.

FIG. 4A is a diagram of a focusing system having a focusing mechanism of first and second Risley elements with an imaging object at a first object location. The focusing mechanism is not correcting for image location. FIG. 4B is a diagram of the focusing system of FIG. 4A with the imaging location at a second object location that a decreased distance to the first object location. The focusing mechanism is not correcting for image location. FIG. 4C is a diagram of the focusing system of FIG. 4B with the imaging location at a third object location that a decreased distance to the second object location. The focusing mechanism is not correcting for image location.

Figure 5A:
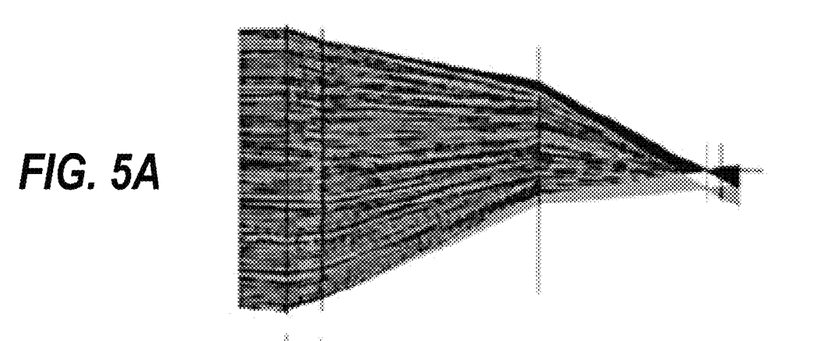
FIG. 5A is a diagram of the focusing system of FIG. 4A wherein the focusing mechanism correcting for the first image location, according to one or more embodiments.
Figure 5B:
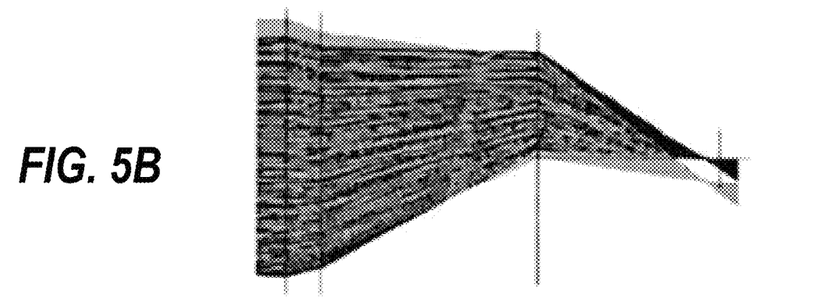
FIG. 5B is a diagram of the focusing system of FIG. 4B wherein the focusing mechanism is correcting for the second image location.
Figure 5C:
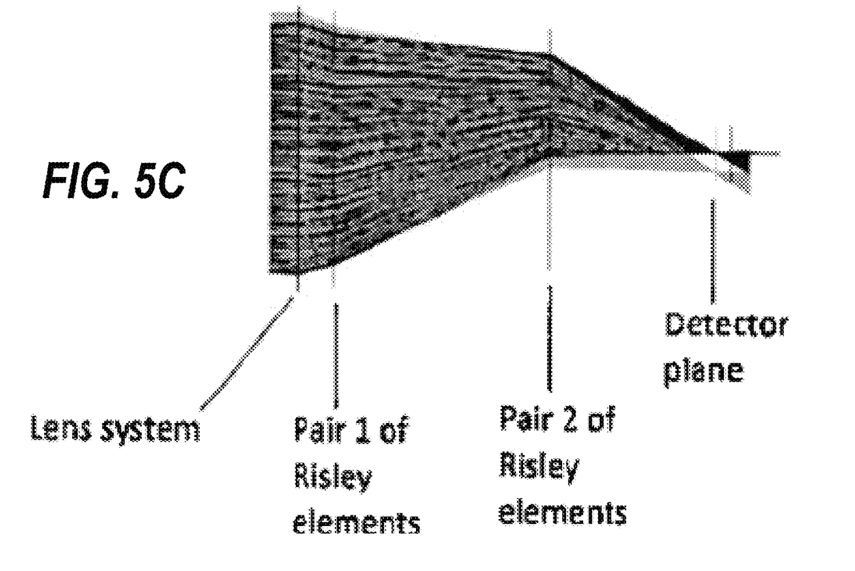
FIG. 5C is a diagram of the focusing system of FIG. 4C wherein the focusing mechanism is correcting for the third image location.

FIG. 5A is a diagram of the focusing system of FIG. 4A wherein the focusing mechanism correcting for the first image location. FIG. 5B is a diagram of the focusing system of FIG. 4B wherein the focusing mechanism is correcting for the second image location. FIG. 5C is a diagram of the focusing system of FIG. 4C wherein the focusing mechanism is correcting for the third image location.

The last case of the Risley Prisms is for axial steering. Whereas a point on the outer circle has exactly one solution, a point in the interior, non-zero region has two solutions, the zero point has infinite solutions. In this case the choice of rotation on one prism is arbitrary and the second prism is required to be rotated in exactly the opposite direction such that the vector sum of the two is zero.

The function of Risley Prisms can be accomplished via any mechanism that results in a fixed angular offset of light. In the case of Risley Gratings [1], diffraction is used to generate the angular offset by sending all of the light into a particular nonzero diffracted order, typically in a polymerized grating form. This technique allows a very lightweight solution to Risley functions, reducing the demand on rotation stages and associated motor control as well as eliminating the chromatic aberration associated with the prism. The disadvantage of the Risley Grating is that 50% of the original source light is likely to be lost through a polarization process needed to reduce the grating to a single order output. In some cases, a circularly polarized source can be used in which case the loss would not occur.

An additional method for the angular deviation of light is a particularly designed photonic crystal structure. In order for the photonic crystals to have the beam diverting properties necessary, they must be spatially variant photonic crystals [2 5]. These have recently been reported to be self-collimating while re-directing energy at an angle of 90 degrees [2 3]. Other, lower angular deviations are also possible using the same techniques. Designs could theoretically be extended to achromatic function.

Fabrication methods are generally specific to the photonic crystal design selected. As such, fabrication methods for this invention cannot be prescribed in general, but several methods are available in literature [4 9] and several methods have been patented [13 17].

A single pair of Risley elements directs the incoming light to an angle away from the optical axis. By adding a second pair of Risleys some distance away from the first pair, but centered on the optical axis, the light from the first pair of Risleys can be directed back toward the optical axis. In this case, the amount of image shift, and hence, the amount of focusing that can be accomplished with the present innovation is determined by the deflection angle of the Risley elements and their spacing within the optical system. The back focal distance (distance from last lens element to the focal point) of the lens system will also limit the amount of focal shift that can be accomplished.

Note that the angle into the detector is changed significantly when the image is shifted using the Risleys. Most detectors maintain their efficiencies for rather substantial angles, but the potential drop in detector efficiency must be considered when using this innovation. If the detector cannot accommodate large enough angles to introduce the image shift, a third pair of Risleys can be introduced to correct the angles at the detector.

The fabrication of the Risley elements is particular to the choice of elements chosen.

Figure 6:
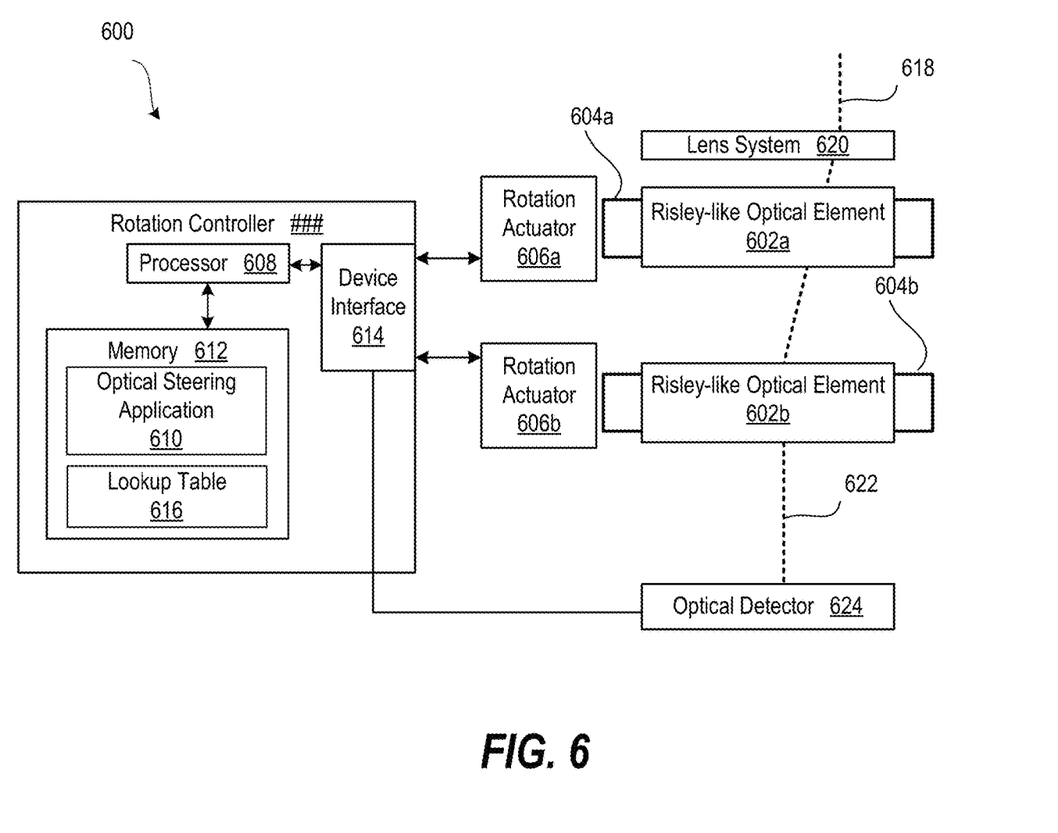
FIG. 6 depicts a diagram of an optical steering system that positions Risley-like optical elements that are respectively held in holders, according to one or more embodiments.

FIG. 6 depicts a diagram of an optical steering system 600 that positions Risley-like optical elements ("Risley elements") 602a-602b that are respectively held in holders 604a-604b. The optical steering system 600 further comprises a rotation controller 605 that drives rotation actuators 606a-606b that respectively and independently rotate holders 604a-604b and thus Risley elements 602a-602b. Rotation controller 605 includes a processor 608 that accesses an optical steering application 610 stored in device memory 612 to execute the rotations via a device interface 614 according to a lookup table 616. Light path 618 enters lens system 620 and is directed to in turn to Risley elements 602a-602b whose respective rotational positions impart optical steering to a redirected light beam 622 onto optical detector 624. Given that Risley elements 602a-602b are already available and placed in the optical path, the steering angles of each pair of Risley elements must be determined. An analytical solution is not available for all scenarios, but a numerical optimization allows the image location to be determined as a function of Risley rotations. The lookup table 616 can be constructed for some applications of the present disclosure. The optimization routine can be accomplished through a variety of advanced methods, or if applications do not demand precision, a brute force method is sufficient. Once Risley element settings are determined for each pair of elements, the elements must be rotated to the correct positions. With improved alignment closer to the longitudinal axis of the optical detector 624, a lens system 626 can be automatically focused with improved tolerance to misalignment and wobble.

Figure 7:
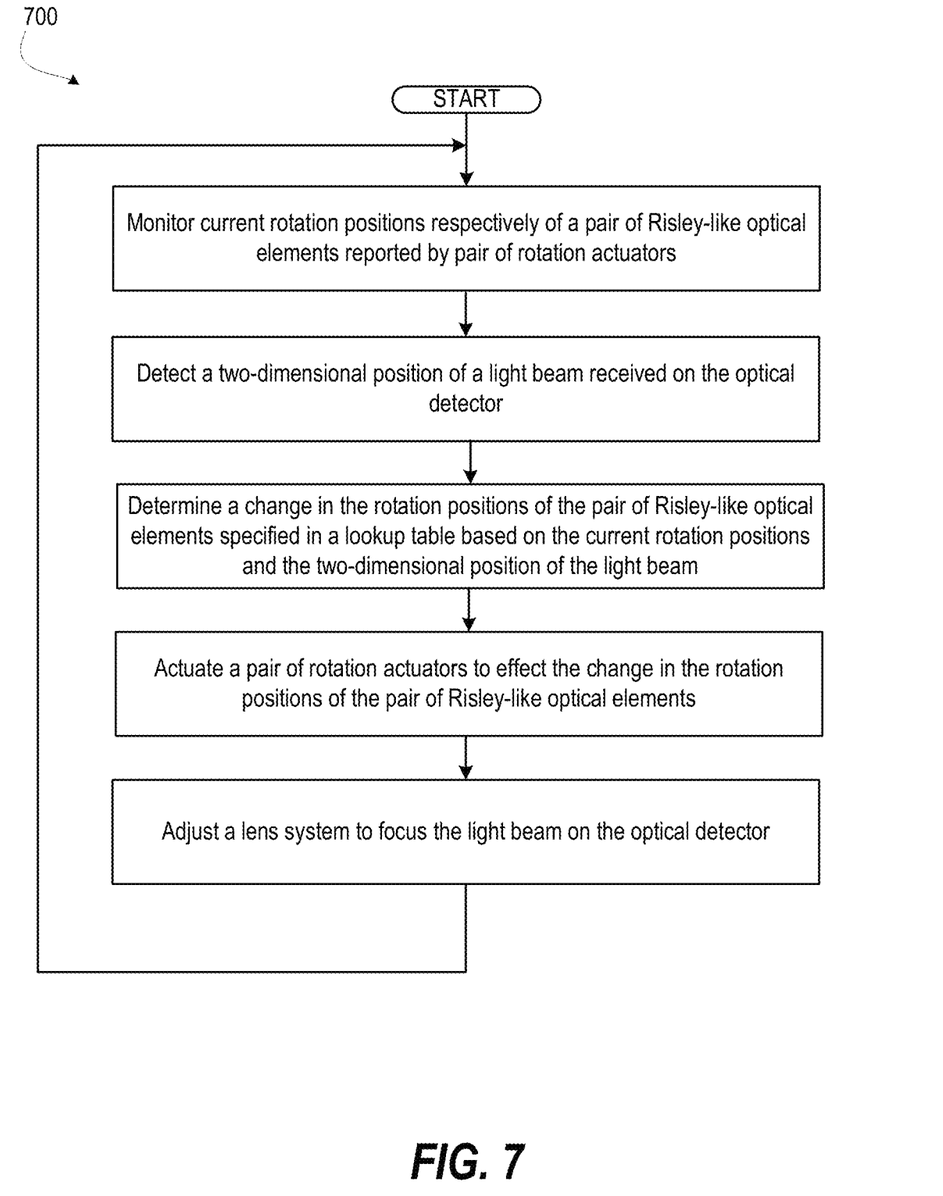
FIG. 7 presents a flow diagram of a method of focus control using a set of shift-invariant optical elements that are fairly tolerant to optical misalignments and wobble in control systems, according to one or more embodiments.

FIG. 7 presents a flow diagram of a method 700 of focus control using a set of shift-invariant optical elements that are fairly tolerant to optical misalignments and wobble in control systems. The method 700 includes monitoring current rotation positions respectively of a pair of Risley-like optical elements reported by pair of rotation actuators (block 702). Method 700 includes detecting a two-dimensional position of a light beam received on the optical detector (block 704). Method 700 includes determining a change in the rotation positions of the pair of Risley-like optical elements specified in a lookup table based on the current rotation positions and the two-dimensional position of the light beam (block 706). Method 700 includes actuating a pair of rotation actuators to effect the change in the rotation positions of the pair of Risley-like optical elements (block 708). Method 700 includes adjusting a lens system to focus the light beam on the optical detector (block 710) Then method 700 returns to block 702.

The following references cited above are hereby incorporated by reference in their entirety:
(1) Calafiore, Giuseppe & Fillot, Quentin & Dhuey, Scott & Sassolini, Simone & Salvadori, Filippo & Prada, Camilo & Munechika, Keiko & Peroz, Christophe & Cabrini, Stefano & Pina-Hernandez, Carlos. (2016). Printable photonic crystals with high refractive index for applications in visible light. Nanotechnology. 27.
(2) U.S. Pat. No. 9,195,092, Escuti, et al., "polarization-independent liquid crystal display devices including multiple polarizing grating arrangements and related devices", Aug. 15, 2013
(3) U.S. Pat. Publ. No. 20160259090, Jiang, et al., "photonic crystal supporting high frequency sensitivity self-collimation phenomenon And design method and use thereof", Sep. 8, 2016.
(4) U.S. Pat. Publ. No. 20170123288, Dmitriev, et al., "compact optical key based on a two-dimensional photonic crystal with 120 degree Folding", May 4, 2017
(5) U.S. Pat. No. 9,726,783, Perrier-Cornet, et al., "methods and systems for thermal printing of photonic crystal materials, and thermally Printable photonic crystal materials and assemblies", 2017.

(6) U.S. Pat. Publ. No. 20160161822, Kim, et al., "smart glass using guided self-assembled photonic crystal", Jun. 9, 2016
(7) U.S. Pat. Publ. No. 20170159206, Ii, et al., "method of making photonic crystal", Jun. 8, 2017.
(8) U.S. Pat. No. 8,610,853, Escuti, "Methods of fabricating optical elements on substrates and related devices", Dec. 19, 2012
(9) U.S. Pat. No. 8,358,400, Escuti, "Methods of fabricating liquid crystal polarization gratings on substrates and related devices", Jan. 22, 2013.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An optical focusing mechanism comprising:
    a pair of Risley-like optical elements that are aligned on a longitudinal axis, each Risley-like optical element being shift-invariant to tolerate optical misalignments and wobble;
    a pair of holders that respectively receive one of the pair of Risley-like optical elements for independent rotation;
    a pair of rotation actuators that are respectively engaged to the pair of holders for rotation;
    an optical detector positioned to receive a beam of light steered by the pair of Risley-like optical elements;
    a memory containing an application and a lookup table; and
    a rotation controller communicatively coupled to the pair of rotation actuators, the optical detector, and the memory, and comprising a processor that executes the application to:
        monitor current rotation positions respectively of the pair of Risley-like optical elements reported by the pair of rotation actuators;
        detect a two-dimensional position of a light beam received on the optical detector;
        determine a change in the rotation positions of the pair of Risley-like optical elements specified in the lookup table based on the current rotation positions and the two-dimensional position of the light beam; and
        actuate the pair of rotation actuators to effect the change in the rotation positions.

2. The optical focusing mechanism of claim 1, wherein the pair of Risley-like optical elements each comprise a Risley prism.

3. The optical focusing mechanism of claim 1, wherein the pair of Risley-like optical elements each comprise a Risley grating.

4. The optical focusing mechanism of claim 1, wherein the pair of Risley-like optical elements each comprise a photonic crystal.

5. A method comprising:
- monitoring current rotation positions respectively of a pair of Risley-like optical elements reported by pair of rotation actuators, each Risley-like optical element being shift-invariant to tolerate optical misalignments and wobble;
- detecting a two-dimensional position of a light beam received on the optical detector;
- determining a change in the rotation positions of the pair of Risley-like optical elements specified in a lookup table based on the current rotation positions and the two-dimensional position of the light beam; and
- actuating a pair of rotation actuators to effect the change in the rotation positions of the pair of Risley-like optical elements.

6. The method of claim 5, wherein the pair of Risley-like optical elements each comprise a Risley prism.

7. The method of claim 5, wherein the pair of Risley-like optical elements each comprise a Risley grating.

8. The method of claim 5, wherein the pair of Risley-like optical elements each comprise a photonic crystal.

* * * * *